(12) United States Patent
Arakawa

(10) Patent No.: US 7,466,446 B2
(45) Date of Patent: Dec. 16, 2008

(54) INFORMATION PROCESSING APPARATUS AND METHOD

(75) Inventor: Naoto Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1138 days.

(21) Appl. No.: 10/627,647

(22) Filed: Jul. 28, 2003

(65) Prior Publication Data

US 2004/0021900 A1 Feb. 5, 2004

(30) Foreign Application Priority Data

Jul. 31, 2002 (JP) ............................. 2002-223129
Jul. 31, 2002 (JP) ............................. 2002-223130

(51) Int. Cl.
G06F 15/00 (2006.01)
(52) U.S. Cl. ...................... 358/1.9; 358/1.15; 358/1.11
(58) Field of Classification Search .................. 358/1.9, 358/1.15, 1.11
See application file for complete search history.

(56) References Cited

U.S. PATENT DOCUMENTS

2002/0054339 A1* 5/2002 Arakawa .................. 358/1.15
2003/0142330 A1 7/2003 Arakawa .................... 358/1.9
2003/0142332 A1* 7/2003 Endoh et al. ............... 358/1.11

FOREIGN PATENT DOCUMENTS

JP 2000-076029 3/2000
JP 2001-142666 5/2001

* cited by examiner

Primary Examiner—Twyler L. Haskins
Assistant Examiner—Michael Burleson
(74) Attorney, Agent, or Firm—Fitzpatrick, Cella, Harper & Scinto

(57) ABSTRACT

The present invention aims to effectively control and administrate color profile data used by many and unspecified users in case of unitarily controlling and administrating processes such as updating of color profile data, deleting of the color profile data, and the like. To do so, the present invention is characterized by an image processing method in a color image forming system in which plural clients and a color image forming apparatus are connected through a network, wherein the color image forming apparatus holds at least one or more color profile data, holds client-classified discrimination information for the plural clients that accessed in regard to the color profile data, and judges in case of deleting the color profile data whether or not to delete the color profile data based on the client-classified discrimination information for the plural clients.

12 Claims, 9 Drawing Sheets

FIG. 3

| PRINT OUTPUT | PRINTER-A |

DOCUMENT NAME: ABCDEFXXXXXX.doc ~200-1

PAPER SIZE: [ A4 ] [▼] ~200-2

THE NUMBER OF PRINTS: [ 1 ] ~200-3

PRINT RANGE: (●) ENTIRETY
200-4
( ) RANGE DESIGNATION [ 1 ] — [ 9 ]

INFORMATION:     200-6
   PROFILE UPDATE INFORMATION EXISTS···    [ COLOR DETAILED SETTING ]
200-5

[ CANCEL ]    [ PRINT ]
200-7      200-8

| PROFILE LIST | | | | | PRINTER-A | PAGE: 1/3 |
|---|---|---|---|---|---|---|
| PROFILE NAME | TYPE | CREATION DATE | VERSION | THE NUMBER OF USERS | LAST ACCESS | |
| IN-001 | INPUT | 1999.1.31 | 1.00 | 103 | 99.5.15 | |
| IN-002 | INPUT | 1999.1.23 | 1.02 | 30 | 99.5.15 | |
| IN-011 | INPUT | 1999.4.12 | 2.00 | 200 | 99.5.15 | |
| IN-016 | INPUT | 1999.3.21 | 2.10 | 1 | 99.3.27 | |
| IN-025 | INPUT | 1999.4.16 | 3.00 | 93 | 99.5.15 | |
| OUT-04test | OUTPUT | 1999.3.18 | 0.05 | 3 | 99.3.19 | |
| IN-033 | INPUT | 1999.5.11 | 1.01 | 38 | 99.5.13 | |

[PREVIOUS PAGE] [NEXT PAGE] [OK]

INFORMATION PROCESSING APPARATUS AND METHOD

BACKGROUND OF THE INVENTION

1. Field of the invention

The present invention relates to an image processing method, a program which achieves the image processing method, a storage medium which stores the program, and a color image forming system which adopts the image processing method.

2. Related Background Art

Conventionally, in a conventional color image processing system, color profile data for matching a color on a host computer and a print output color with each other is unitarily controlled on the host computer. That is, the conventional color image processing system does not adopt a structure that the color profile data is shared and used by plural client computers on a network, but adopts a structure that the color profile data is independently controlled by each client's host computer on the network. For this reason, it is necessary for a user of each client computer to independently perform processes such as updating and deleting of the shared color profile data used when print output is performed.

Therefore, it is no conception of effectively controlling and administrating the color profile data used by many and unspecified users in case of unitarily controlling and administrating the processes such as the updating of the color profile data, the deleting of the color profile data, and the like.

SUMMARY OF THE INVENTION

The present invention is made in consideration of such a conventional problem, and an object thereof is to effectively control and administrate color profile data used by many and unspecified users in case of unitarily controlling and administrating processes such as updating of color profile data, deleting of the color profile data, and the like.

In order to achieve the above object, the present invention provides an image processing method in a color image forming system in which plural clients and a color image forming apparatus are connected through a network, wherein the color image forming apparatus holds at least one or more color profile data, holds discrimination information in regard to each of the plural clients that accessed the color profile data, and judges in case of deleting the color profile data whether or not to delete the color profile data based on the discrimination information in regard to each of the plural clients.

Moreover, to achieve the above object, the present invention provides an image processing method an image processing method in an image processing system in which plural client computers and one or more color image forming apparatuses are connected, the method comprising the steps of: retrieving a list of profiles in the color image forming apparatus, by using profile name designation information of a page description language received from the client computer; setting the coincident profile to a color processing controller; and registering, in a case where the client computer is a new access client, information indicating access to the profile of the profile name designation information.

Other functions and features of the present invention will become apparent from the following description taken in conjunction with the accompanying drawings.

BRIEF DESCRIPTION OF THE DRAWINGS

FIG. 3 is a diagram showing a print dialog box according to the embodiment of the present invention;

FIG. 7 is a diagram showing an operation panel of profile list display and a display utility dialog box according to the embodiment.

DETAILED DESCRIPTION OF THE PREFERRED EMBODIMENTS

Hereinafter, one embodiment of the present invention will now be described in detail with reference to the accompanying drawings.

A color image forming system according to one embodiment of the present invention consists of plural client computers which are connected on a network, at least one color image forming apparatus which is likewise connected on the network, and a digital color copying machine which is connected to the color image forming apparatus and has a printer output function.

Figure 1:
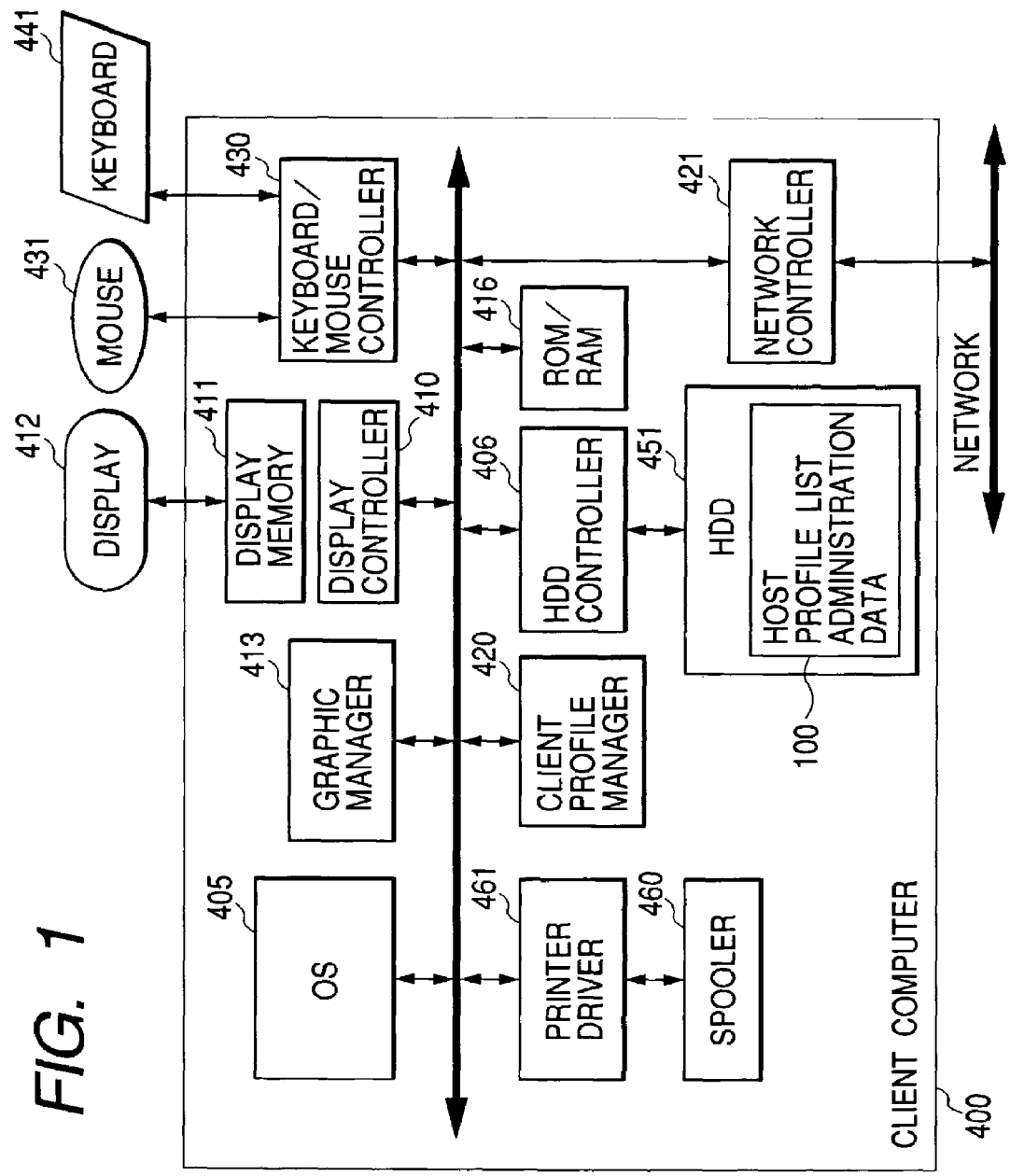
FIG. 1 is a block diagram showing the structure of a client computer according to the embodiment of the present invention.

FIG. 1 is a block diagram showing the structure of a client computer 400 provided at the side of a client.

Figure 2:
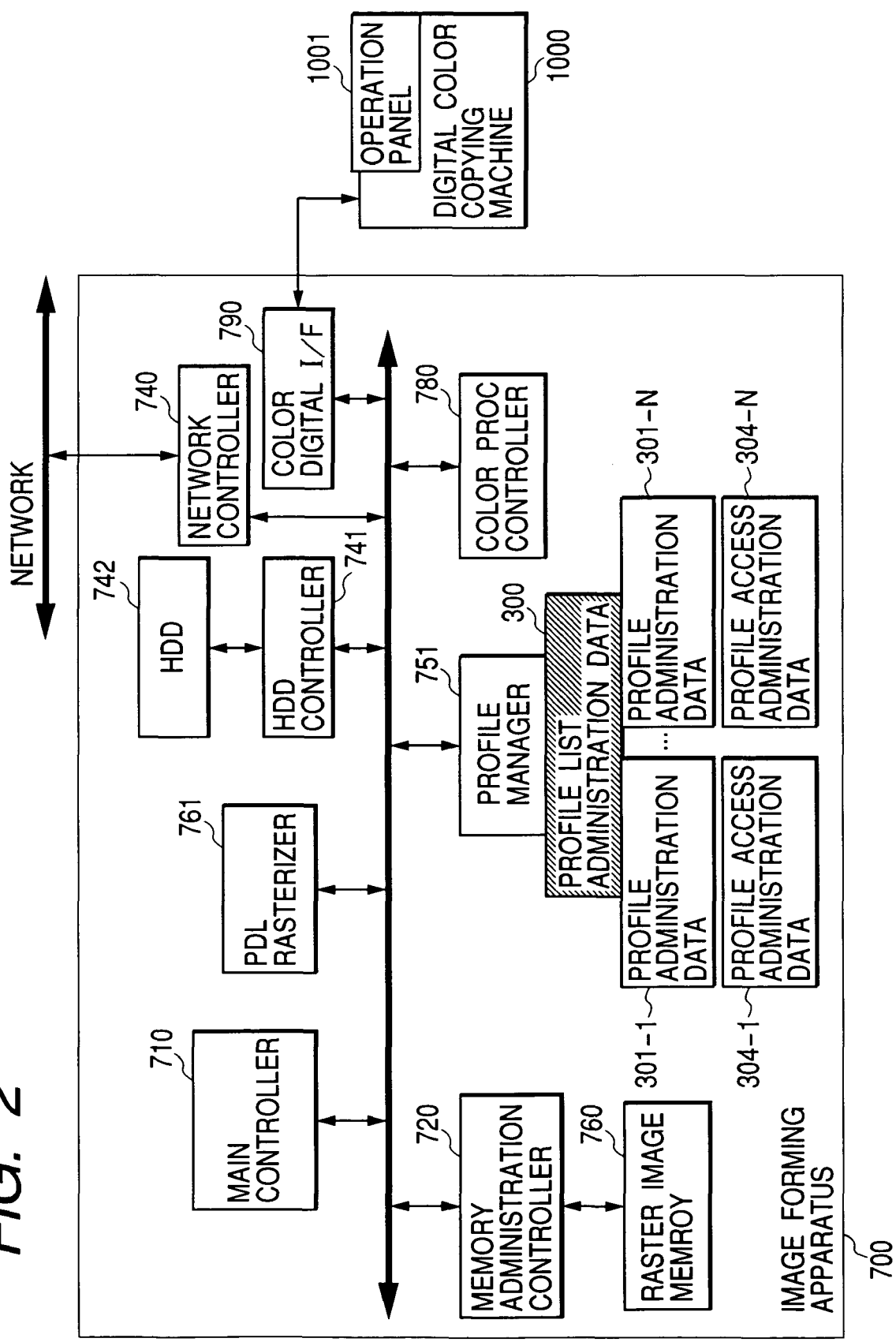
FIG. 2 is a block diagram showing the structure of a color image forming apparatus according to the embodiment of the present invention.

The client computer 400 consists of a network controller 421 which is used to exchange instruction code data and PDL (page description language) code data with a color image forming apparatus 700 shown in FIG. 2 through a network, an OS (operating system) 405 which is used to control the client computer 400 as a whole, an HDD (hard disk drive) 451 in which the instruction code data and the PDL code data are temporarily registered and also other various data are stored, an HDD controller 406 which controls the HDD 451, a memory 416 which consists of a ROM and a RAM, a mouse 431 and a keyboard 441 which are used by a user as instruction input means, a keyboard/mouse controller 430 which controls the mouse 431 and the keyboard 441, a color display 412 which displays layouts, editing contents and menus necessary in various image processes, a display memory 411 in which the data to be displayed is stored, a display controller 410 which controls the color display 412, a graphic manager 413 which performs the various image processes on the client computer 400, a display process and a graphic creation process and the like, a printer driver 461 which converts data from application programs on the client computer 400 into the PDL code data for a printer output process through the graphic manager 413, and a spooler 460 which performs a spool process to the PDL code data converted by the printer driver 461.

Figure 5:
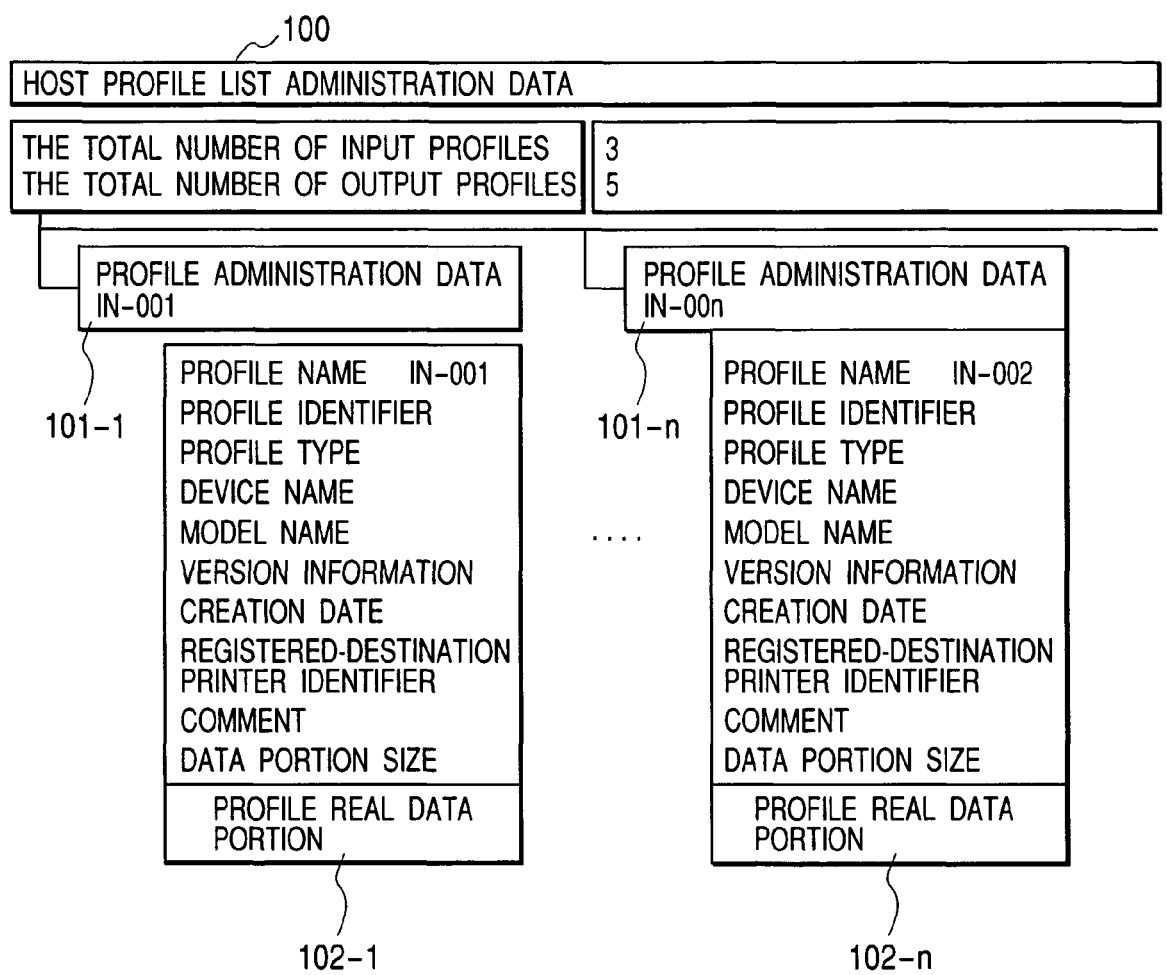
FIG. 5 is a diagram showing profile list administration data in a host computer according to the embodiment of the present invention.

When the user outputs an image to a printer on the basis of the application program, profile data is incorporated in the PDL code data by the printer driver 461. Here, the profile data is used in a color conversion process to match the tint of a displayed image and the tint of a print-output image with each other, and is stored as host profile list administration data 100 of FIG. 5 in the HDD 451. Thus, the profile data is updated, exchanged, administrated, controlled and the like by a client profile manager 420.

FIG. 2 is a block diagram showing the structure of the color image forming apparatus 700 according to the embodiment of the present invention.

Figure 6A:
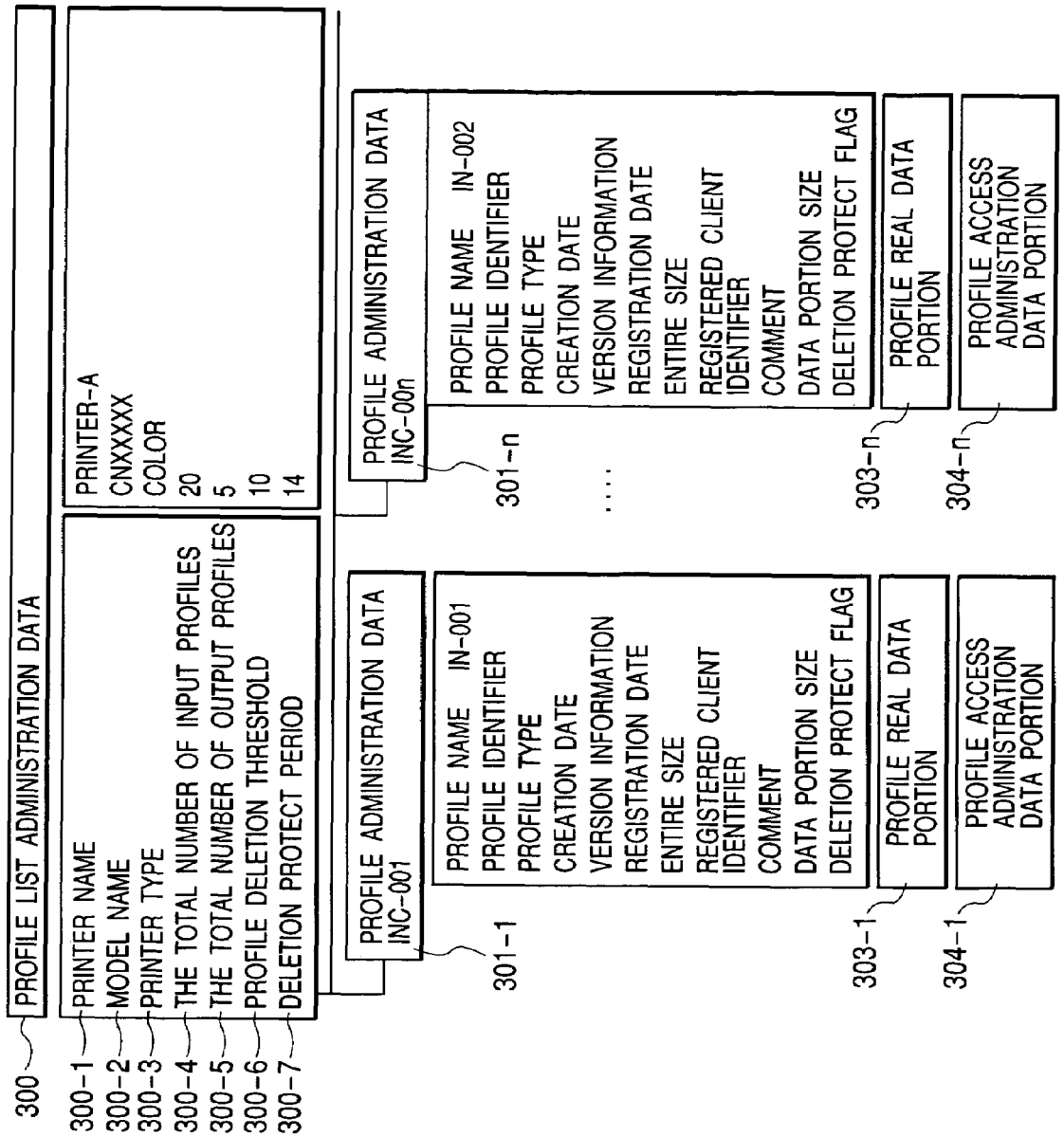
FIGS. 6A and 6B are diagrams respectively showing profile list administration data and profile access administration data in the color image forming apparatus.

The color image forming apparatus 700 roughly consists of a main controller 710 which controls the apparatus itself as a whole, plural registered profile administration data 301-1, ..., 301-n shown in FIG. 6A, profile list administration data 300 which is used to administrate or control the entire structure of these profile administration data, a profile manager 751 which registers, updates, administrates or controls the profile administration data and the profile list administration data, a PDL rasterizer 761 which interprets the code of the PDL code data for the printer converted by the printer driver 461 and then converts the interpreted code into a raster image on the basis of a drawing instruction of the client computer 400, an HDD 742 in which the PDL code data sent from the client computer 400 is temporarily stored, an HDD controller 741 which controls the HDD 742, a raster image memory 760 in which the raster image data rasterized for each page is registered, and a memory administration controller 720 which administrates or controls the raster image memory 760. Incidentally, it should be noted that the profile list administration data 300 includes a printer name 300-1, a model name 300-2, a printer type 300-3, the total number of input profiles 300-4, the total number of output profiles 300-5, a profile deletion threshold 300-6, and a deletion protect period 300-7.

Moreover, in the color image forming apparatus 700, a color processing controller 780 performs as needed a color conversion process according to the contents of designated input/output profile data, by using a profile identifier uniquely determined for the designated color process in the PDL code data. The color processing controller 780 once converts the color data rasterized based on the PDL code data into the data in a standardized intermediate color space on the basis of the input profile data representing a designated monitor profile or the like, and then converts the data in the standardized intermediate color space into the data in an output color space on the basis of the designated output profile data for the printer.

Besides, as external interfaces, the color image forming apparatus 700 includes a network controller 740 which controls a network process to the network of the client computer 400, and a color digital I/F (interface) 790 which transfers and receives image data and instruction code data with a digital color copying machine 1000 having a printer output unit.

In addition, the digital color copying machine 1000 having the printer output unit further includes an operation panel 1001 for displaying various operation information and instructing various operations.

Hereinafter, an operation procedure for the profile process using the above-structured color image forming system will be described.

<Client's Registration of Input Profile>

The input profile is made up by profile information concerning colors of a monitor used by the user, and the standardized profile data such as an ICC (International Color Consortium) profile or the like. The profile data is supplied from monitor manufacturing corporations or the like and input by, e.g., an operator's input operation through a network such as the Internet or an intranet, a medium such as an external storage means (e.g., a CR-ROM or a DVD), or the like. Then, the client profile manager 420 of the client computer 400 registers and updates the profile administration data in the host profile list administration data 100.

First, the client profile manager 420 checks whether or not the format of the designated profile information is a standardized format. At that time, "profile name," "profile type" representing the format type such as the ICC profile and whether the profile in question is the input profile or the output profile, "device name" uniquely determined and representing which manufacturing corporation the profile in question belongs to and which profile in the represented manufacturing corporation the profile in question corresponds to, sub information such as "model name" of the device, and discrimination information such as "creation date," "version information" and the like are obtained from the format information of that format.

The client profile manager 420 checks profile administration data 101-1, ..., 101-n in the host profile administration data 100 on the basis of the obtained information in the format, in a sequential order beginning from profile administration data IN-001 and ending to profile administration data IN-00n, so as to discriminate or judge whether or not there is the same profile administration data. More specifically, the client profile manager 420 checks the profile administration data plural times corresponding to the total number of the input profiles and the total number of the output profiles. Then, when there is no same profile administration data, then the previous total number of the profiles is counted up, and new profile administration data IN-002 is generated as new profile data.

Then, the client profile manager 420 sets the information obtained from the profile data to the respective fields of "profile name," "profile identifier," "profile type," "device name," "model name," "version information" and "creation date."

Furthermore, the client profile manager 420 sets the size of the real profile data portion to the field of "data portion size" in the profile administration data, and copies the real data portion to a profile real data portion 102-1. This is repeatedly performed until a profile real data portion 102-n.

Here, it should be noted that, since the actual printer to which this profile is applied is not determined yet at this time, "registered-destination printer identifier" is still null.

<Client's Registration of Output Color Profile>

The output color profile is made up by the information representing the profile of the printer to which the data is output. At a time when the printer driver 461 is installed on the client computer 400, this profile information is registered in the host profile list administration data 100 as a default profile of the designated printer.

Here, it should be noted that parameters of "profile name," "profile identifier," "profile type," "device name," "model name," "version information" and "creation date" other than the real data of the output profile have been previously held on an installed application program.

The processing procedure of the output profile is as follows. When the installed application program of the printer driver 461 is executed on the OS, it requests the client profile manager 420 to newly generate profile administration data for data output. Then, the client profile manager 420 receives the above parameters such as "profile name" and the like held in the installed application program, and thus sets these parameters respectively to corresponding parameter portions of the newly generated profile administration data.

At that time, since there is no real data of the profile, the parameter of "data portion size" is registered to be null. Thus, on the client computer 400, there are merely the registration name and the like of the profile, but there is no actual profile data.

<User's Print Execution Process>

When the user print-outputs a color document generated on the client computer 400, the application program issues a trigger for requesting the print process to the OS. Then, the printer driver 461 is called in response to this trigger, whereby a dialog box for the print output shown in FIG. 3 is opened.

FIG. 3 is the diagram showing a print dialog box 200 to be displayed by the printer driver 461.

The user sets various parameters on the print dialog box 200 by using a UI (user interface) thereof.

That is, the user performs the setting by using the UI such as the mouse or the like, on the printer dialog box which includes, as a general printer dialog box, a document name section 200-1 showing the document name on the application program, a paper size section 200-2 to be used to set the size of the paper to which the print output is performed, a section 200-3 to be used to set the number of prints, a print range setting section 200-4 to be used to designate a print page range in case of printing the document having plural pages or to designate all-page printing, a dialog display button 200-6 to perform the color detailed setting as in the embodiment, an information display section 200-5 showing the current status or state of the printer driver 461, a cancel button 200-7, and a print button 200-8.

<Process of Color Detailed Setting>

Figure 4:
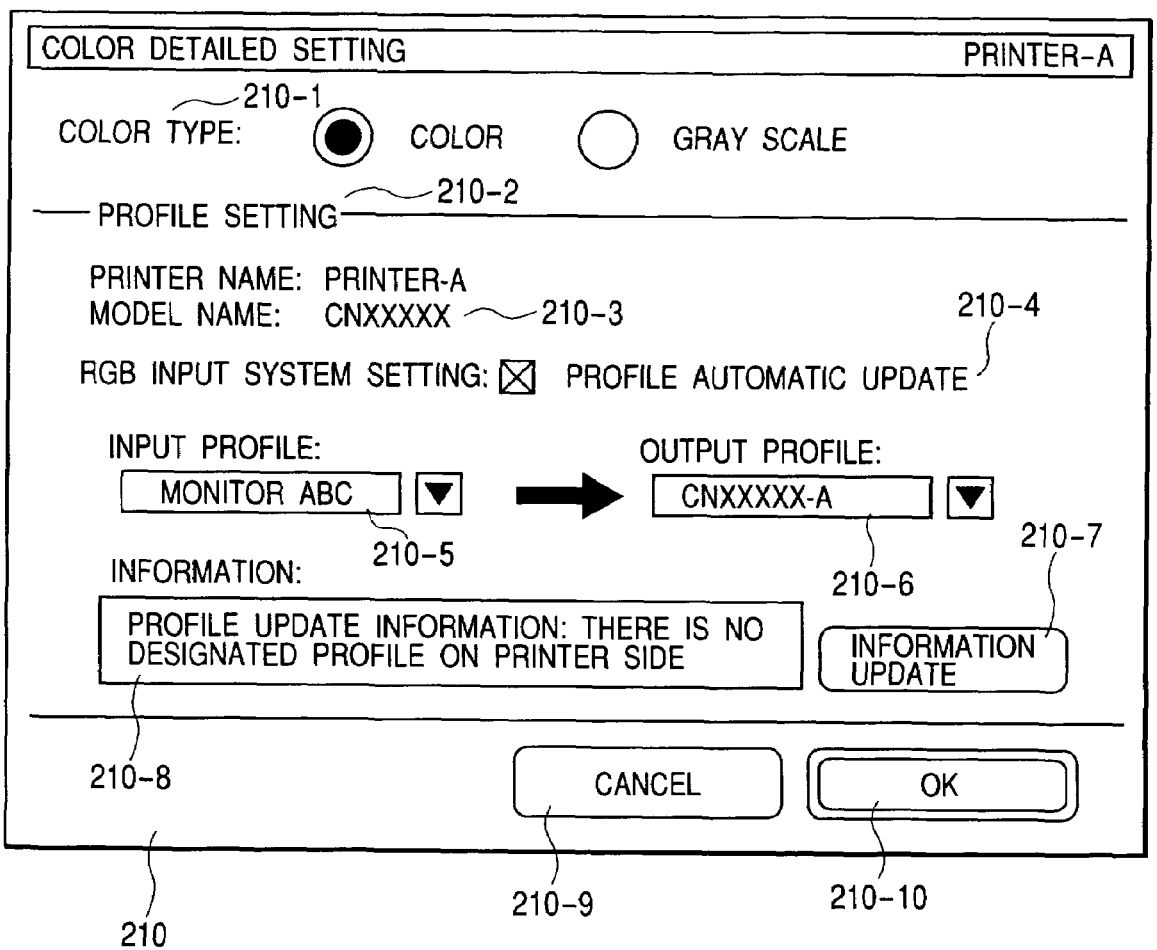
FIG. 4 is a diagram showing a dialog box in case of color detailed setting according to the embodiment of the present invention.

When the user intends to perform the detailed setting concerning the colors, he first depresses the dialog display button 200-6 to perform the color detailed setting, whereby the printer driver 461 displays a color detailed setting dialog box 210 shown in FIG. 4 on which the various settings concerning the colors are performed.

The color detailed setting dialog box 210 includes a color type section 210-1 on which it is set in case of performing the printing whether the color printing is to be performed or the printing is to be performed after converting color data into black and white data, and a profile setting section 210-2 which is the feature of the embodiment.

The profile setting section 210-2 includes a printer name section, a model name section 210-3 showing the name of the printer designated on the printer name section, an input profile selection section 210-5, an output profile selection section 210-6, a check box 210-4 on which it is set whether or not the printer (color image forming apparatus) should automatically update the color profile when the color profile data set and requested by the client computer does not exist on the side of the printer (color image forming apparatus), an information display section 210-8 on which status information representing the status or state of the color profile or the like is displayed, an information update button 210-7 which is used to intentionally perform the update of the status condition of the color profile as communicating with the controller on the side of the printer, a cancel button 210-9, a print button 210-10, and the like.

<Selection of Input Profile>

The user sets the input color profile to the input profile selection section 210-5 provided on the color detailed setting dialog box 210.

That is, the list of the input color profiles to be shown in the input profile selection section 210-5 are obtained beforehand from the list of the profile names registered in the host profile list administration data 100 on the client computer 400 by the client profile manager 420 in accordance with the above procedure. The list of the input profiles is used as the list of the profiles concerning the colors of the monitor used by the user, whereby the user selects the arbitrary input profile from this list by using an indication device such as the mouse or the like.

<Selection of Output Profile>

The output profile selection section 210-6 to be used to select the output profile data is displayed on the UI by obtaining the list of the output profile names registered in the host profile list administration data 100 from the client profile manager 420 by the printer driver 461 in accordance with the same procedure as that to obtain the input profile. Thus, the user can select the arbitrary printer output profile on this list by using the mouse or the like.

On one hand, in advance, at a time when the printer driver 461 is called, the color profile list information in the host profile list administration data 100 already registered in the color image forming apparatus of the designated printer is obtained by the printer driver 461 in accordance with a later-described procedure to obtain the color profile list information registered in the image forming apparatus, and the obtained information is temporarily held in the printer driver 461. Also, when the information update button 210-7 on the color detailed setting dialog box 210 is depressed, the same procedure can be performed as needed.

<Obtainment of Color Profile List Information Registered in Image Forming Apparatus>

With respect to the designated color image forming apparatus 700, the printer driver 461 sets the printer name and the model name of the digital color copying machine connected to this color image forming apparatus, and a uniquely determined color profile data list request command to a communication packet, and then sends the communication packet to the color image forming apparatus 700 having the designated unique network identifier through the network controller 421.

The main controller 710 of the color image forming apparatus 700 analyzes the contents of a series of the communication packets sent from a network manager and thus discriminates the request command from the client computer 400.

Here, when the list request command of the color profile data already registered in the color image forming apparatus 700 has been designated, then the main controller 710 instructs the profile manager 751 to transmit the profile list administration data 300 to the client computer side. The profile manager 751 administrates or controls the profile list administration data 300 having the structure as shown in FIG. 6A in the color image forming apparatus 700, and checks the designated printer name and its model name in the request packet sent from the client computer and the printer name and its model name respectively corresponding to the designated names in the profile list administration data 300. When these names are coincided, the profile manager 751 sets parameters of "profile name," "profile identifier," "profile type," "creation date" and "registration date" in one ore more profile administration data INC-001, INC-002, . . . to a communication packet of a uniquely determined color profile data list return command, by the number corresponding to the total number of the input profiles and the total number of the output profiles. Then, the profile manager 751 sends the obtained communication packet to the client computer 400 from which the color profile data list request command has been issued, through the network controller 740, whereby the printer driver 461 can obtain the list.

<In Case Where There is No Color Profile Data in Target Image Forming Apparatus>

The printer driver 461 compares the input and output profiles designated by the user's depression of the above dialog display button 200-6 with the input and output profiles on the profile administration list sent from the color image forming apparatus 700 and designated to be checked whether the coincident profile names exist based on the color profile data list request command.

Here, with respect to the input and output profiles, in the color image forming apparatus 700, when there is no profile same as these profiles, a registration process to register the color profile in the color image forming apparatus 700 is performed.

<Registration of Color Profile in Color Image Forming Apparatus>

When it is discriminated or judged in the above procedure that there is no designated profile in the color image forming apparatus 700, the printer driver 461 performs the process designated at the check box 210-4 for the automatic update of the color profile on the color detailed setting dialog box 210.

<In Case of Profile Automatic Update OFF>

When the check box 210-4 for the automatic update of the color profile is OFF, the information representing that there is no designated profile on the printer side is displayed on the information display section 210-8. When the print process is executed in this state, a default input or output profile in the color image forming apparatus 700 is used.

<In Case of Profile Automatic Update ON>

When the check box 210-4 for the automatic update of the color profile is ON, the printer driver 461 sets the printer name and its model name uniquely determined on the network of the target printer of the digital color copying machine connected to the color image forming apparatus 700, and the corresponding profile administration data and the profile real data portion in the host profile list administration data 100 in regard to the color profile data selected by the user and not existing in the color image forming apparatus 700 to a communication packet of a uniquely determined color profile data registration command, and sends the obtained communication packet to the color image forming apparatus 700 having the designated unique network identifier through the network controller 421.

Then, the main controller 710 of the color image forming apparatus 700 analyzes the communication packet of the color profile data registration command sent through the network controller 740, and instructs the profile manager 751 to register the profile data sent from the client computer 400.

The profile manager 751 checks the target printer name in the communication packet, and sequentially retrieves the profile administration data, from the profile administration data INC-001, of which the profile identifier coincides with the profile name requested by the client computer 400 to be registered, for the total number of the input and output profiles. Thus, the profile manager 751 confirms that there is no same profile administration data.

By such a retrieval process, when the color profile data sent from the client computer 400 is not yet registered in the color image forming apparatus 700, the profile manager 751 discriminates or judges whether the color profile data represents the input profile or the output profile on the basis of the parameter "profile type" in the profile administration data of the client computer set in the communication packet, and then increments the total number of the corresponding profiles. Moreover, the profile manager 751 sets the parameters of "profile name," "profile identifier," "profile type," "creation date," "device name" on the basis of the profile administration data of the client computer extracted in such a means as above. Furthermore, the profile manager 751 sets the data of registration to "registration date," sets the data size of the profile real data portion in the communication packet to "data portion size," and sets the client identifier uniquely discriminated on the network of the client computer to "registered client identifier."

Then, the profile data of the profile real image data portion in the communication packet is copied to profile read data portions 303-1, . . . , 303-$n$(in a profile real data portion 303).

On one hand, when the color profile data designated by the user on the client computer does not exist in the color image forming apparatus 700 to which the designated printer is connected, the color profile data on the client computer is registered in the profile list administration data 300 in the color image forming apparatus by a series of the above processes.

Thus, at a time when the color profile data is registered in the color image forming apparatus 700, the network controller 740 of the color image forming apparatus 700 sends back to the client computer 400 a communication packet including the identifier representing that the registration process succeeded, whereby the printer driver 461 on the client computer 400 side can confirm that the profile has been registered in the color image forming apparatus 700 on the printer side.

After the process based on the color profile data registration command succeeded, the printer driver 461 writes the network identifier of the color image forming apparatus 700, in which the profile has been registered, to "registered-destination printer identifier" of the target profile administration data in the host profile list administration data 100. The network identifier acts as the flag representing that the profile has been registered in the color image forming apparatus 700 of the designated printer.

<Process to Generate PDL Code Data of Printer Driver>

After each parameter on the dialog box of the printer driver 461 was set, when the user depresses the print button 200-8 by using the indication device such as the mouse or the like, the printer driver 461 requests the graphic manager 413 to output the data from the user's application program. Thus, the data from the user's application program is interfaced with a standardized graphic drawing instruction through the graphic manager 413, and the graphic drawing instruction is converted into PDL code data by the printer driver 461.

<Incorporation of Color Profile Setting Command into PDL Code Data>

Before the graphic drawing instruction from the graphic manager 413 is converted into the PDL code data, the printer driver 461 sets the profile names of the input and output profiles designated on the dialog box by the user respectively as the parameters of input and output profile designation commands uniquely determined in the PDL command, thereby creating a PDL operator of the color conversion portion of the PDL code data.

Then, the color profile setting commands and the PDL operator are listed in the stream of the PDL code data. At that time, the profile data designated by the user has been already registered in the color image forming apparatus 700 by the printer driver 461, whereby the real data portion of the profile can not be incorporated into the stream of the PDL code data every time. Thus, it is possible to effectively send the PDL code data.

<Conversion Process into PDL Code Data>

The printer driver 461 consecutively converts the graphic drawing instruction sent from the graphic manager 413 into the PDL code data to perform streaming of the PDL code data, and then transmits the PDL code data to the spooler 460 as needed. Here, the spooler 460 performs a process to once store the PDL code data stream converted by the printer driver 461.

The stored PDL code data stream is divided into plural communication packets and transmitted through the network controller 421 to the color image forming apparatus 700 having the previously and uniquely determined printer being the process target of the printer driver 461.

Here, a previously and uniquely determined print execution command has been set in the communication packet, the data portion of the PDL code data stream is divided into plural portions and set in the communication packet, and the communication packet is then transmitted to the color image forming apparatus 700 through the network.

<Registration Process of PDL Code Data in Color Image Forming Apparatus>

The main controller 710 of the color image forming apparatus 700 obtains the above communication packet for the print execution from the client computer which executed a print job, through the network controller 740, and discriminates or judges that the obtained communication packet represents the command to request the print execution. Then, the main controller 710 extracts, as needed, the data portion of the PDL code data from the transmitted plural communication packets including the PDL code data, and registers the PDL code data in the HDD 742 through the HDD controller 741.

<Rasterizing Process of PDL Code Data in Color Image Forming Apparatus>

The main controller 710 causes the PDL rasterizer 761 to perform a process to create a raster image on the basis of the PDL code data previously registered in the HDD 742.

The PDL rasterizer 761 reads the PDL code data from the HDD 742 as needed, and analyzes the read PDL code data. Then, when a specific color process is necessary for the PDL code data, the color processing controller 780 performs the color process of the image data rasterized by the PDL rasterizer 761, and the memory administration controller 720 finally registers the image data rasterized from the PDL code data in the raster image memory 760.

<Extraction of Profile Setting Command in PDL Code Data>

In the process to analyze the PDL code data, the PDL rasterizer 761 detects "input profile command" described on the PDL code data by the printer driver 461 on the client computer 400 according to the above procedure, and "input profile name" being the parameter of "input profile command."Similarly, the PDL rasterizer 761 detects "output profile command" described on the PDL code data and "output profile name" being the parameter of "output profile command."

Moreover, the PDL rasterizer, 761 causes the profile manager 751 to check, based on the profile name designation on the PDL code data detected in the above procedure, whether or not the respective input and output profiles have been registered in the profile list administration data 300 in the color image forming apparatus 700.

<Input and Output Profile Setting of Color Processing Controller>

The profile manager 751 sequentially compares the profile administration data INC-001, INC-002, . . . , in the profile list administration data 300, of which the profile name coincides with the profile name designated in the PDL code data from the client computer 400, for the total number of the input and output profiles. Then, when there is the profile administration data of which the profile name coincides with the designated profile name, the profile manager 751 sets the profile type and the profile real data portion of the corresponding profile administration data to the color processing controller 780 as input and output profiles of the color processing controller.

Figure 6B:
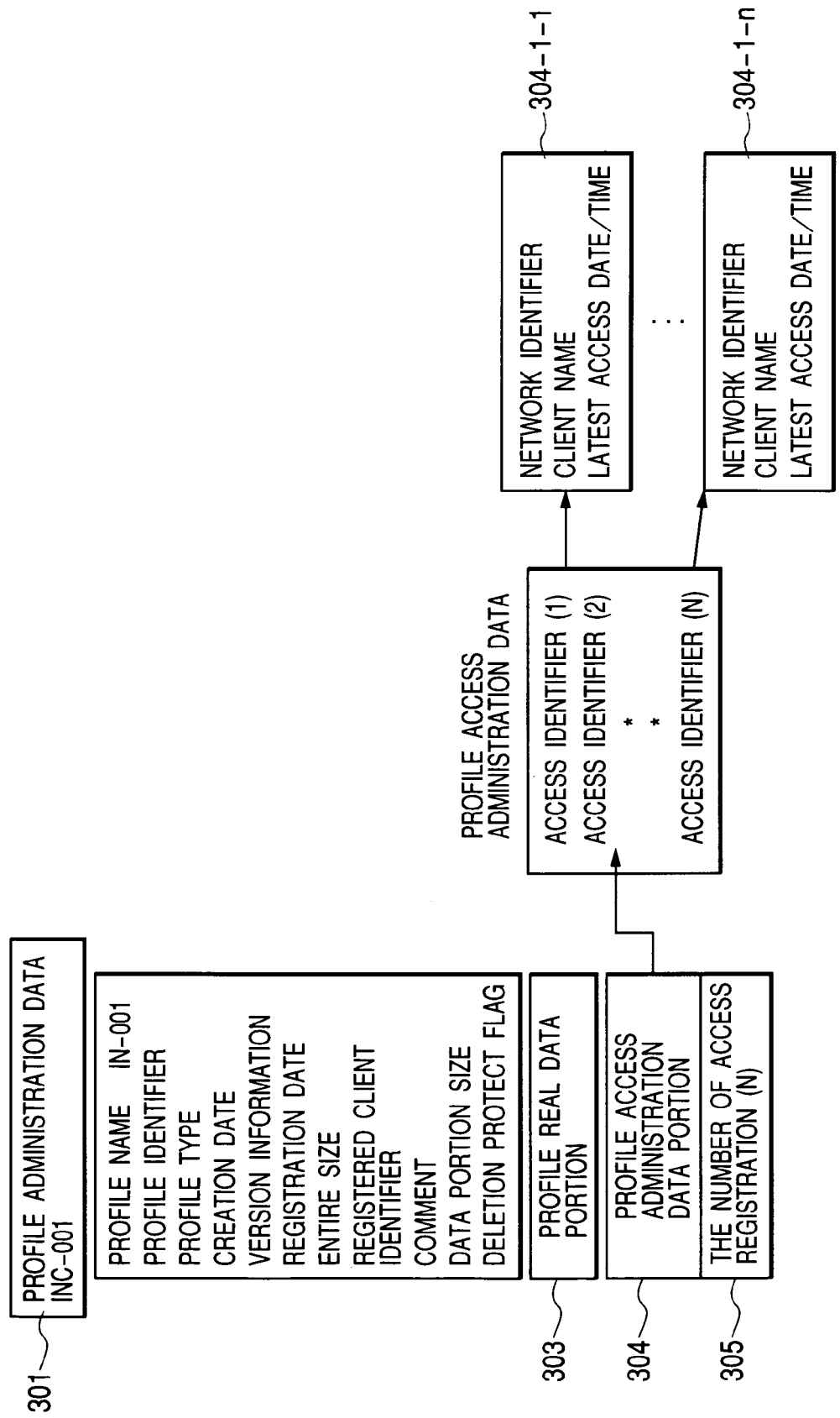

At that time, the profile manager 751 compares a network identifier with a client name in regard to the client which executed the print job, by the number of times corresponding to the number of access registration (N) 305, i.e., access identifiers 304-1-1 to 304-1-n of a profile access administration data portion 304 (consisting of profile access administration data portions 304-1, . . . , 304-n) in the target profile administration data 301 shown in FIG. 6B. Then, when there is no coincidence, the profile manager 751 counts up the number of access registration of the profile access administration data portion 304 as new access clients. In addition, the profile manager 751 registers network identifier and client name of the user in question, and further registers information concerning, e.g., access date and time.

On one hand, when there is a coincidence in the comparison, the profile manager 751 updates the date and time information of the coincided access data. Thus, the latest access date and time information of the color profile is stored in regard to each user.

When a profile is not designated on the PDL code data, previously and uniquely determined profile data is set as a default to the color processing controller 780.

<Output from Digital Color Copying Machine>

Thus, the image data rasterized from the PDL code data is converted into the data in the standardized intermediate color space on the basis of the series of input profiles through the color conversion controller, and the converted image data is further converted into the data in the printer color space based on the output profile, whereby, with respect to each page, the image data converted from the PDL code data based on the profile is registered in the raster image memory 760. At a time when the image of one page is formed, the main controller 710 transmits the uniquely determined print execution command to the digital color copying machine 1000 having the printer output unit through the color digital I/F 790. Similarly, the main controller 710 transmits the image data of the previously formed one page through the color digital I/F 790, whereby the printer output unit of the digital color copying machine 1000 performs the output process.

<Color Profile List Display>

A list of the color profile information registered in the color image forming apparatus 700 can be displayed in response to external access.

When a user instructs and requests to display the list of the already-registered color profiles to the operation panel 1001 of the digital color copying machine 1000, the main controller 710 transfers the profile administration information to the profile manager 751 through the color digital I/F 790. Then, as shown in FIG. 7, the color profile list is displayed on a dialog box 230 of the operation panel 1001 on the digital color copying machine 1000.

The color profile list displayed on the operation panel 1001 includes the data obtained from the profile administration data portion in the color image forming apparatus 700. More specifically, the color profile list includes "profile name" 230-10, "profile type" 230-11, "creation date" 230-12, "version information" 230-13, "the number of users" 230-14, and "last access date/time" 230-15. Here, "the number of users" 230-

14 indicates the information of the number of access registration (N) 305, i.e., the contents of the access identifiers 304-1-1 to 304-1-$n$ of the profile access administration data portion 304, and "last access date/time" 230-15 indicates the last access date and time by the client which last accessed in the access identifiers of the profile access administration data. When there are the large number of color profiles, the displayed color profile list can be changed by depressing a next page button 230-8 or a previous page button 230-7.

The page on the list at that time can be easily confirmed based on the page number displayed at a section 230-5. Incidentally, it should be noted that a printer name is displayed at a section 230-6.

Moreover, the display same as that shown in FIG. 7 can be performed even on a dialog box based on a profile display utility program on the client computer through the client profile manager 420 on each client computer.

<Color Profile Deletion Process>

The current state of the color profile data once registered in the profile administration data portion of the color image forming apparatus 700 can be confirmed on the above dolor profile list display, and, if necessary, the already-registered color profile data can be deleted.

Figure 8:
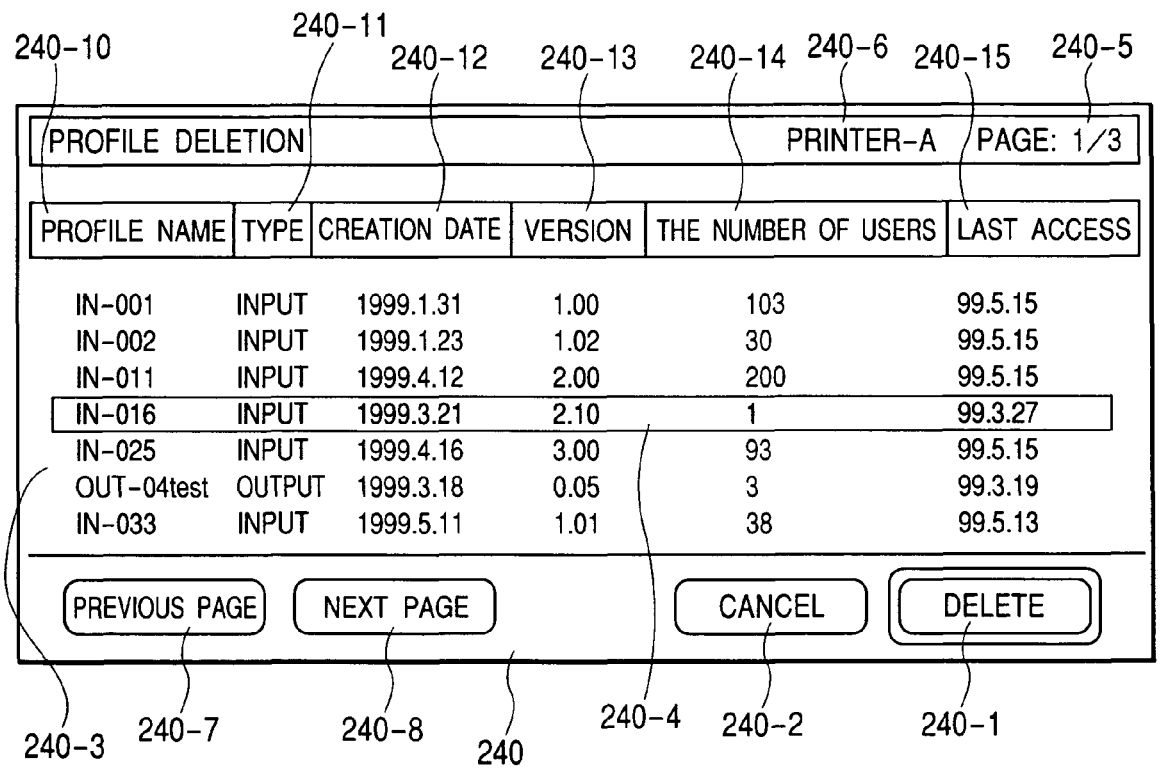
FIG. 8 is a diagram showing an operation panel of profile deletion and a deletion utility dialog box according to the embodiment.

When a user instructs and requests to delete the already-registered color profiles to the operation panel 1001 of the digital color copying machine 1000, the main controller 710 transfers the profile administration information to the profile manager 751 through the color digital I/F 790. Then, as shown in FIG. 8, the operation screen for deleting the color profile is displayed on a dialog box 240 of the operation panel 1001 on the digital color copying machine 1000.

As well as the above color profile list displayed, the displayed contents of the deletion operation panel include the data obtained from the profile administration data portion in the color image forming apparatus 700. More specifically, the contents include "profile name" 240-10, "profile type" 240-11, "creation date" 240-12, "version information" 240-13, "the number of users" 240-14, and "last access date/time" 240-15. Here, "the number of users" 240-14 indicates the information of the number of access registration (N) 305, i.e., the contents of the access identifiers 304-1-1 to 304-1-$n$ of the profile access administration data portion 304, and "last access date/time" 240-15 indicates the last access date and time by the client which last accessed in the access identifiers of the profile access administration data. Therefore, to delete the color profile, the user can confirm the profile use status list which displays access states to the profile in regard to each of the plural clients.

When there are the large number of color profiles, the displayed list can be changed by depressing a next page button 240-8 or a previous page button 240-7. The page on the list at that time can be easily confirmed based on the page number displayed at a section 240-5. Incidentally, it should be noted that a printer name is displayed at a section 240-6.

In any case, the line of the profile that the user wishes to delete is indicated in a list 240-3 by handling a touch panel to highlight it as indicated by numeral 240-4. Then, the user depresses a deletion button 240-1. Incidentally, numeral 240-2 denotes a cancel button.

<Color Profile Deletion Process by Profile Deletion Threshold>

The main controller 710 receives through the color digital I/F 790 an instruction to delete the color profile by using a profile deletion threshold, and then instructs the profile manager 751 to delete the designated color profile. The profile manager 751 compares the profile deletion threshold 300-6 in the profile list administration data 300 with the number of access registration 305 of the profile access administration data portion 304 in the profile administration data portion being the designated deletion target.

The parameter of the profile deletion threshold 300-6 in the profile list administration data 300 can be set on the operation panel 1001 or based on a profile utility program on each client computer. Here, the profile deletion threshold is the threshold as to whether or not to delete the color profile on the basis of the number of users which perform the print process by using the designated color profile.

The profile manager 751 compares the above profile deletion threshold 300-6 with the number of access registration 305 of the profile access administration data portion 304 in the designated deletion target. Then, when the number of access registration 305 is smaller than the profile deletion threshold 300-6, the target color profile is deleted, and the target profile administration data INC-OOX is deleted from the profile list administration data 300, whereby the total number of profiles in the profile list administration data is changed.

On one hand, when the number of access registration 305 is equal to or larger than the profile deletion threshold 300-6, a warning message or the like indicating that the deletion is impossible is displayed, and the color profile deletion process ends.

<Color Profile Deletion Process by Deletion Protect Period>

In addition to the judgmental standard for the color profile deletion using the profile deletion threshold, the profile manager 751 can use as the judgmental standard a deletion protect period by which the deletion of the color profile is permitted when the last access date and time of the designated color profile exceeds a certain period.

As well as the above deletion process, the main controller 710 receives through the color digital I/F 790 an instruction to delete the color profile, and then instructs the profile manager 751 to delete the designated color profile. The profile manager 751 compares a parameter of the deletion protect period 300-7 in the profile list administration data 300 with a difference between "last access date/time" 230-15 of the last-accessed client in the access identifiers of the designated deletion-target profile access administration data and current date and time held and updated by the main controller 710.

The parameter of the deletion protect period 300-7 in the profile list administration data 300 can be set on the operation panel 1001 or based on a profile utility program on each client computer, and this parameter is the threshold as to whether or not to delete the color profile based on the date and time when the designated color profile is last-accessed. More specifically, the deletion of the color profile is determined according to whether or not the period by the date and time when performing the deletion exceeds the parameter of the deletion protect period 300-7.

Then, when the period by the date and time when performing the deletion exceeds the parameter of the deletion protect period 300-7, the target color profile is deleted, and the target profile administration data INC-00X is deleted from the profile list administration data 300, whereby the total number of profiles in the profile list administration data is changed.

On one hand, when the period by the date and time when performing the deletion does not exceed the parameter of the deletion protect period 300-7, the warning message or the like indicating that the deletion is impossible is displayed, and the color profile deletion process ends.

The parameter (value) of the deletion protect period 300-7 can cope with either the number of days and a time value converted and obtained from the number of days.

The judgment based on the profile deletion threshold and the judgment based on the deletion protect period can be performed alone or combined together by the profile manager 751. Moreover, as well as the displaying of the list, such a series of the deletion processes can be displayed and thus instructed, in the same manner as in FIG. 8, on the dialog box according to the profile deletion utility program on the client computer through the client profile manager 420 on each client computer.

The color image forming apparatus 700 is incorporated in the above digital color copying machine, and thus can be used as the unified apparatus. Thus, when one digital color copying machine is directly connected to the network, the digital color copying machine can process as a printer the PDL code data sent from the client computer.

As described above, according to the embodiment, it is possible to achieve the system in which the access information of the color profile data from each client computer is stored in the printer controller, and thus the access information of the designated profile can be unitarily administrated or controlled.

Moreover, in regard to the printer controller which stores the access information of the color profile data of each client computer capable of unitarily administrated, it is possible to effectively control or administrate the deletion process of the color profile information shared and used by many and unspecified users.

(Other Embodiment)

The above embodiment includes the hardware that structures the network. However, the above embodiment can be achieved by software that sequentially performs respective data processes. That is, it is needless to say that the present invention can be achieved in a case where a storage medium (or a recording medium) storing the program codes of software for realizing the functions of the above embodiment is supplied to a system or an apparatus and then a computer (or CPU or MPU) in the system or the apparatus reads and executes the program codes stored in the storage medium. In this case, the program codes themselves read from the storage medium realize the functions of the above embodiment, and the storage medium storing such the program codes constitutes the present invention. Besides, the program codes can be written and stored in various storage media such as a CD, an MD, a memory card, an MO and the like.

Moreover, it is needless to say that the present invention includes not only a case where the functions of the above embodiment are realized by the execution of the program codes read by the computer, but also a case where an OS (operating system) or the like operating on the computer executes all the process or a part thereof according to the instructions of the program codes, thereby realizing the functions of the above embodiment.

Moreover, it is needless to say that the present invention includes not only a case where the functions of the above embodiment are realized by executing the program codes read by the computer, but also a case where an OS (operating system) or the like running on the computer performs a part or all of the actual process on the basis of instructions of the program codes and thus the functions of the above embodiment are realized by the above process.

Moreover, it is needless to say that the present invention includes a case where the program codes read from the storage medium are once written in a memory provided in a function expansion board inserted in the computer or a function expansion unit connected to the computer, and then a CPU or the like provided in the function expansion board or the function expansion unit performs a part or all of the actual process according to the instructions of the program codes, and thus the functions of the above embodiment are realized by the above process.

As many apparently widely different embodiments of the present invention can be made without departing from the spirit and scope thereof, it is to be understood that the invention is not limited to the specific embodiments thereof expect as defined in the appended claims.

What is claimed is:

1. An information processing method in an image processing apparatus which is capable of being accessed via a network by a plurality of client computers, said method comprising the steps of:

registering profile list administration data including a list of profile names, profiles corresponding to each profile name and access information, each of the profiles being sent to the information processing apparatus from a client computer corresponding to a respective one of the profile names;

receiving image data, a profile name and access information of a client computer via the network;

comparing the received profile name with each profile name of the profile list administration data;

setting a profile corresponding to the profile name in a case where the received profile name is coincident with the profile name of the profile list administration data to the processing apparatus;

performing the image forming processing on the received image data based on the set profile;

determining whether the received access information is coincident with the registered access information; and registering the access information to the registered profile list administration data in a case where the access information is new to the registered access information due to determining in said determining step.

2. An information processing method according to claim 1, wherein the access information indicates the client computer accessing the set profile.

3. An image processing method according to claim 1, wherein the received image data is data of page description language code.

4. An information processing method according to claim 1, wherein the access information includes at least one of a network identifier of a user of the client computer and a client name of the user.

5. An information processing method according to claim 1, wherein the access information includes at least one of a number of client computers accessing the set profile, a network identifier of a user of the client computer and a client name of the user (access information includes the number of clients accessed).

6. An information processing method according to claim 5, further comprising the step of deleting the registered profile based on the access information.

7. An information processing method according to claim 6 wherein said deleting step includes deleting any of the registered profiles for which the number of the client computers that have accessed that profile is lower than a predetermined threshold.

8. An information processing method according to claim 1, wherein the access information is displayed on an operation unit of the client computer or the image forming apparatus, and an operation unit of a digital copying machine connected to the image forming apparatus.

9. An information processing method according to claim 1 wherein the access information includes discrimination information in regard to each of the plural client computers that accessed to the set profile.

10. An information processing method according to claim 1, wherein a list of profile access information in regard to each of the plural client computers is displayed.

11. A computer-readable storage medium which stores a program consisting of codes to execute an information processing method in an image processing apparatus which is capable of being accessed via a network by a plurality of client computers, said method comprising the steps of:

registering profile list administration data including a list of profile names, profiles coffesponding to each profile name and access information, each of the profiles being sent to the information processing apparatus from a client computer coffesponding to a respective one of the profile names;

receiving image data, a profile name and access information of a client computer via the network;

comparing the received profile name with each profile name of the profile list administration data;

setting a profile corresponding to the profile name in a case where the received profile name is coincident with the profile name of the profile list administration data to the processing apparatus;

performing the image forming processing on the received image data based on the set profile;

determining whether the received access information is coincident with the old access information; and registering the access information to the registered profile list administration data in a case where the access information is new to the registered access information due to determining in said determining step.

12. An information processing apparatus which is capable of being accessed via a network by a plurality of client computers, said apparatus comprising:

a registering unit adapted to register a profile list administration data including a list of profile names, profiles corresponding to the each profile name and an access information, each of the profiles being sent from a client computer to the image forming apparatus, coffesponding to the each profile name;

a receiving unit adapted to receive an image data, a profile name and an access information of a client computer via the network;

a comparing unit adapted to compare the received profile name with the each profile name of the profile list administration data;

a setting unit adapted to set a profile corresponding to the profile name in case that the received profile name is coincident with the profile name of the profile list administration data to said image processing apparatus;

a processing unit adapted to perform the image forming process to the received image data based on the set profile;

a determining unit adapted to determine whether the received access information is coincident with the hold access information; and a registering unit adapted to register the access information to the registered profile list administration data in case that the access information is new to the registered access information due to determining by said determining unit.

* * * * *